April 11, 1950
R. F. HUFFMAN
2,503,488
HYDRAULIC BRAKE ADJUSTING AND REGULATING MEANS
Filed June 6, 1947
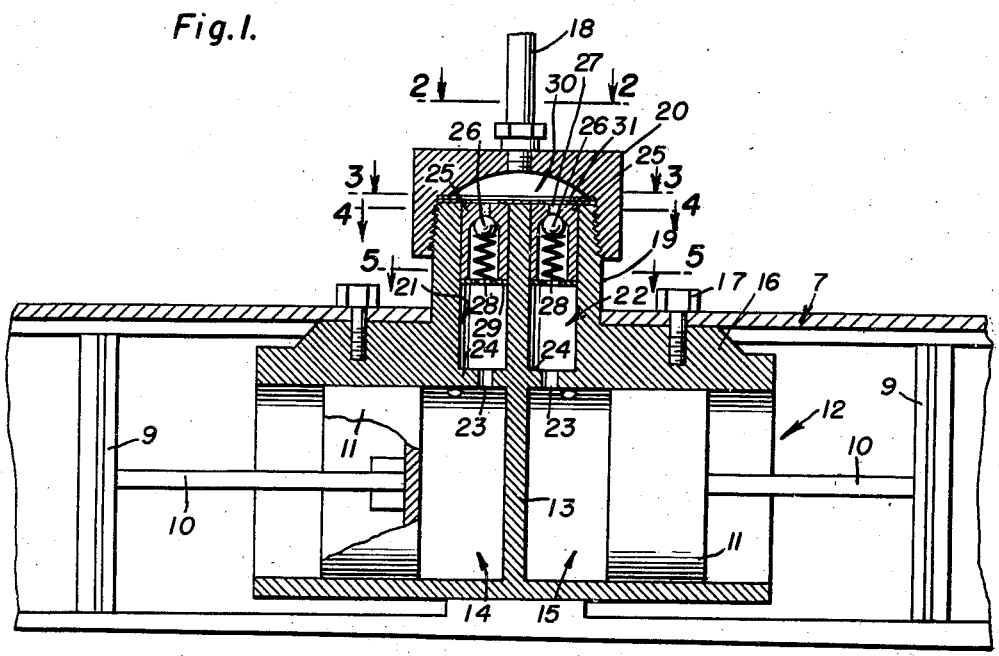
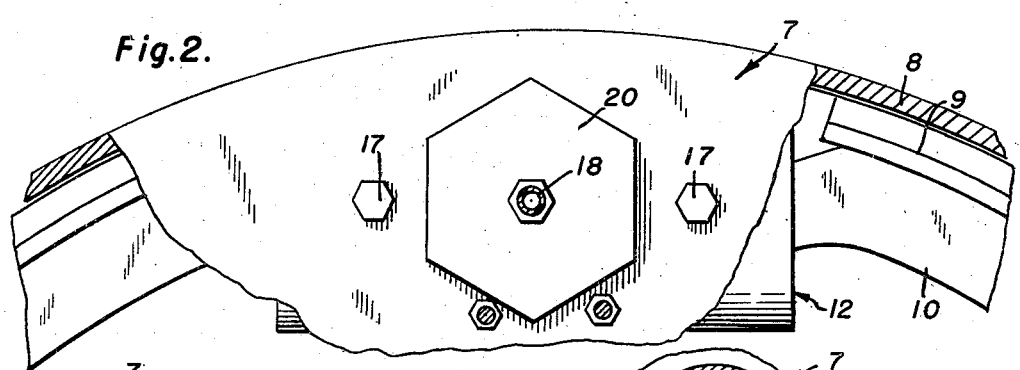
Inventor
Robert F. Huffman
By Clarence A. O'Brien
and Harvey B. Jacobson
Attorneys Patented Apr. 11, 1950

2,503,488

UNITED STATES PATENT OFFICE 2,503,488

HYDRAULIC BRAKE ADJUSTING AND REGULATING MEANS

Robert F. Huffman, Craig Healing Springs, Va.

Application June 6, 1947, Serial No. 753,092

1 Claim. (Cl. 188—152)

The present invention relates to hydraulic brakes which are especially, but not necessarily, adapted for use on automobiles and equivalent vehicles and has reference, more particularly, to structural and functional improvements incorporated in a wheel cylinder, said improvements having to do with automatic governing and operation of the wheel cylinder and brake shoes which are operatively connected to said wheel cylinder.

More specifically, the invention appertains to novel means partially built into and incorporated between a wheel cylinder and fluid supply line from the master cylinder, functioning as automatic compensating and control means for said wheel cylinder, whereby the latter, regardless of slight leakage, or wear and tear on the brake shoes and brake drum, will be automatically and constantly charged with sufficient fluid to reliably and positively apply the brakes.

In keeping with my inventive ideas and the underlying principles of the invention, I provide a wheel cylinder in which the trapping chamber or chambers for brake fluid are automatically replenished with a predetermined amount for effective working conditions, this by way of valved piston means, the latter forming the equalizing and compensating structure and being situated for operation between the brake fluid delivery line, the line from the master cylinder, and said wheel cylinder.

A further object of the invention is to provide a wheel cylinder which is especially cast or otherwise made to provide a central partition providing individual chambers in which the usual cups are slidable, said wheel cylinder also having a centrally disposed, laterally projecting extension, said extension being screw-threaded to accommodate a cap to which the fluid delivery line is connected, and said extension being bored to provide piston-equipped cylinders for automatically replenishing and controlling the supply of a predetermined amount of fluid to the wheel cylinder to insure uniform results.

Other objects and advantages will become more readily apparent from the following description and the accompanying illustrative drawings.

In the drawings, wherein like numerals are employed to designate like parts throughout the views:

Figure 1 is a fragmentary view showing a section through the wheel cylinder, illustrating the cups, brake shoes and automatic compensator and regulator means constructed in accordance with the principles of the present invention.

Figure 2 is a view on the line 2—2 of Figure 1, looking in the direction of the arrows.

Figures 3, 4 and 5 are cross sections on the lines 3—3, 4—4 and 5—5 of Figure 1, respectively, all looking in the direction of the indicating arrows.

Referring now to the drawings by distinguishing reference numerals, and first to Figures 1 and 2, it will be seen that a fragmentary portion of a brake support is shown and denoted by the reference numeral 7. The brake drum includes an annular rim portion 8 with suitable surfaces to accommodate the expansible and contractible brake shoes 9. The brake shoes are operated by customary push-pull arms 10 connected with cups 11 operable in the wheel cylinder 12. Appropriate return springs (not shown) as well as suitable closures for the open ends of the wheel cylinder are, in practice, provided. However, these are not important details of the instant invention, from the standpoint of novelty, and are therefore omitted in order to focus attention on the real invention.

In accordance with this invention, there is a central partition 13 provided in the wheel cylinder which defines trapping chambers, or individual cylinders 14 and 15 in which said cups 11 are mounted for projectable and retractable reciprocation. The central body portion of the cylinder is substantially increased in thickness and strength, as at 16, to accommodate bolts or equivalent fastenings 17 securing the cylinder, as a unit, to the brake support or equivalent structure. The hydraulic fluid delivery pipe or line, which in practice is connected with the master cylinder and, in turn, brought into play by brake pedal means, is denoted by the numeral 18 and it is this line which is connected with the partitioned wheel cylinder through the medium of the unique fluid-equalizing and pressure-compensating and regulating means. The preferred embodiment constituting said means is in the form of a lateral extension which is cylindrical in cross section and denoted by the numeral 19. This is externally screw-threaded to accommodate a screw cap 20 to which the pipe 18 is connected. Said extension 19 is provided with a pair of bores 21 and 22 forming miniature cylinders, and these cylinders are at right angles to the main cylinders 14 and 15 and communicate with the latter by way of restricted ports or orifices 23. Incidentally, the bottom portions of the cylinders, indicated at 24, provide stop seats for the slidable fluid pressure operated pistons 25. Both pistons are the same in construction and each comprises a centrally socketed body, the socket containing a ball check valve 26 and the valve being seated to close adjacent port means 27. The ball check valve, or automatic fluid pressure equalizing device, is normally seated by spring means 28 fitted in the socket, the spring means being held in by a centrally apertured washer 29 which provides an appropriate base for the spring. The piston is normally operable by fluid pressure and the check valve operates in conjunction therewith and is normally seated. The cap 20 is recessed to provide an initial trapping chamber 30 with which the pipe 18 communicates. An appropriate packing washer is provided at 31 to render the assemblage leak-proof and interposed between the washer and the adjacent end of the valved extension 19 is an adapter plate 32 (see Fig. 3), which plate has openings or apertures 33 registering with the ports 27. Incidentally, this plate 32 serves as a stop means for the outward sliding movement of the pistons 25. Thus, the pistons move in the cylinders 22 and are limited, as they slip outwardly, by the plate means 32; whereas they are limited in their opposite inward movements by the stop shoulders 24.

In operation, it is to be assumed that the wheel cylinder is fully charged with brake fluid, and under such circumstances, pressure applied to a foot pedal will serve to deliver brake fluid from the master cylinder (not shown) to the auxiliary or initial trapping chamber 30, which fluid will act on the pistons 25, will force the pistons 25 downwardly or inwardly into the cylinders 22, thus building up, forcibly, the reserve of brake fluid in the wheel cylinder chambers 14 and 15 by way of the inlet ports 23. This means that the piston-like cups 11 will then slide outwardly in opposite directions and away from the partition 13 to apply the brake shoes 9. It is to be noted that the pistons 25, collectively, are considerably smaller than the diameter of the divided cylinders 14 and 15, and the reciprocating travel of the pistons 25 in relation to the pistons or cups 11 is therefore proportionate to relative diameters.

If the brake shoes, in relation to the brake drums, have correct clearance, applying the brake pedal causes the pistons 25 to operate, as stated, and equalized pressure in both chambers 14 and 15, acting simultaneously against the cylinders or cups 11, serves to cause the brake shoes to respond and be mechanically applied. Obviously, under normal fluid pressure conditions, the compensating or check valves 26 remain seated under the influence of the springs 28.

Manifestly, if a leakage of fluid has occurred in the wheel cylinder chambers or cylinders 14, or if the brake shoes or other parts have been unduly worn, the lack of necessary fluid for positive and quick operation of brakes will be replenished by way of the valved pistons 25. That is to say, after the pistons have been operated to seat against the stops 24, continued fluid pressure such as overcomes the pressure then in the cylinders 14 and 15 will serve to unseat the valves 26 and these valves will let in additional fluid to replenish the depleted amount in said cylinders and to thus equalize and compensate fluid pressure supply in respect to chambers 14, 15 and 30.

The distance the pistons 25 travel may be changed by inserting shims or additional washers, this in an obvious manner. This stop washer means 32 may be suitably anchored in place to avoid turning and to insure alignment of the holes 33 with the piston-equipped cylinders 22.

It is believed that the invention will obviate the necessity of having the brakes adjusted during the entire life of the brake lining on the brake shoes. When the shoes are relined, a small amount of fluid may be drained through the bleed holes to allow the new lining to go inside the drums. Pumping the brake pedal one or two times will automatically adjust the new lining and said lining will stay adjusted until virtually worn out for further replacement. Pistons, seals and valves should have a very substantial life because of the small distance they travel and due to the self-lubricating facilities embodied in the adopted structure. Dirt and foreign and extraneous matter is substantially, if not altogether, eliminated. The parts will obviously be comparatively inexpensive on an original car installation job. Consequently, added safety will be susceptible of incorporation in new cars, and anything which improves and make more efficient the operation of ever-so-needed good brakes is worthy of consideration.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

In a hydraulic brake construction of the class shown and described comprising a wheel cylinder open at its ends and provided intermediate its ends with a partition defining separate and independent main cylinders, each cylinder being adapted, in use, to accommodate a brake shoe operating cup, a lateral extension formed on one side of said wheel cylinder, said extension being provided with relatively small parallel bores defining auxiliary compensating cylinders, said latter cylinders having fluid ports in registration with complemental main cylinders, a valved automatically compensating slack adjuster piston slidable in each auxiliary cylinder, the outer end portion of said extension being screw threaded, a single screw cap screwed on said screw threaded end, said screw cap being provided with a single internal cavity lined up and communicating with said auxiliary cylinders and providing an initial fluid trapping and distributing chamber, said chamber being in communication with both auxiliary cylinders for equalization of fluid supply, said cap being provided with an accommodation for a fluid delivery line.

ROBERT F. HUFFMAN.

REFERENCES CITED

The following references are of record in the file of this patent:

UNITED STATES PATENTS

| Number | Name | Date |
| --- | --- | --- |
| 2,385,625 | Hopmans | Sept. 25, 1945 |

FOREIGN PATENTS

| Number | Country | Date |
| --- | --- | --- |
| 365,069 | Great Britain | Jan. 6, 1932 |
| 377,478 | Great Britain | July 28, 1932 |